United States Patent [19]
Brownlie et al.

[11] Patent Number: 5,588,182
[45] Date of Patent: Dec. 31, 1996

[54] ARRANGEMENT FOR SECURING A DOOR TO AN ENCLOSURE

[75] Inventors: Alan W. Brownlie; David T. Middleton, Jr., both of Skaneateles, N.Y.; James W. Robertson, Oberlin; Francis J. Shay, Palmyra, both of Pa.

[73] Assignee: The Whitaker Corporation, Wilmington, Del.

[21] Appl. No.: 455,925

[22] Filed: May 31, 1995

Related U.S. Application Data

[62] Division of Ser. No. 32,890, Mar. 18, 1993, Pat. No. 5,473,115.

[51] Int. Cl.⁶ ........................................................ E05D 1/06
[52] U.S. Cl. .................................. 16/268; 16/266; 16/380
[58] Field of Search ............................ 16/268, 266, 265, 16/271, 262, 243, 248, 260, 309, 350, 351, 352, 353, 374, 376, 317, 319, 380, 386, 387, 264

[56] References Cited

U.S. PATENT DOCUMENTS

| | | | |
|---|---|---|---|
| 54,618 | 5/1866 | Slusser | 16/351 |
| 530,377 | 12/1894 | Ashton | 16/351 |
| 4,334,338 | 6/1982 | Conn | 16/266 |
| 4,584,739 | 4/1986 | Konen | 16/266 |
| 4,715,090 | 12/1987 | Morris | 16/264 |
| 4,729,134 | 3/1988 | Hillebrand et al. | 16/266 |
| 4,979,264 | 12/1990 | Ramsauer | 16/387 |
| 5,337,453 | 8/1994 | Bargesser | 16/380 |

*Primary Examiner*—Chuck Y. Mah
*Attorney, Agent, or Firm*—Anton P. Ness

[57] ABSTRACT

A durable, economical, and aesthetically pleasing terminal enclosure (2) for housing standardized terminal blocks (50). The terminal enclosure (2) includes a base section (30) formed as an open-faced trough with integral perpendicular end panels (24, 34). The terminal enclosure (2) also has a pair of gull-wing doors (10, 20) which may be closed to cover the base section (30). The doors (10, 20) are formed with a curvature to provide a continuous arching cover over the base section (30), and a plurality of legs (12-1 ... 5, 22-1 ... 5) is angled downwardly and inwardly from each door for pivotal attachment to the underside of the base section (30). The combined curvature of the legs (12-1 ... 5, 22-1 ... 5) and the doors (10, 20) allows opening without a need for frontal clearance. In addition, the legs (12-1 ... 5, 22-1 ... 5) are pivoted to the base section (30) in such a way that they may be locked in the full-open position, thereby freeing both hands for servicing.

8 Claims, 14 Drawing Sheets

ARRANGEMENT FOR SECURING A DOOR TO AN ENCLOSURE

RELATED APPLICATION INFORMATION

This application is a Divisional of U.S. patent application Ser. No. 08/032,890 filed Mar. 18, 1993, now U.S. Pat. No. 5,473,115.

FIELD OF THE INVENTION

The present invention relates to electrical junction boxes and, more particularly, to a weatherproof terminal enclosure with gull wing doors for providing easy access to internal telephone junction blocks.

BACKGROUND OF THE INVENTION

Outdoor junction boxes for telephone and/or power lines must provide a safe, durable, and weatherproof housing within which multiple wires can be terminated. For safety reasons, such junction boxes are typically mounted well out of reach, such as high overhead on telephone poles or buildings.

The junction boxes house standardized terminal blocks that have multiple wire termination silos spaced along an outwardly facing surface. The silos house contacts which are electrically interconnected within the terminal block. Wires may be inserted into the open silos through apertures or slots of the contacts, and the contacts are then manipulated to penetrate through the wire insulation and electrically engage the conductors of the wires. This way, the appropriate line-to-line connections are completed. It is common for five, twelve, and twenty-five connections (with twice the number of terminations) to be completed in the above-described manner at one junction box.

Of course, the enclosure which houses the terminal block(s) must provide individual access for each line interiorly of the enclosure, and it must permit convenient access for servicing. In addition, the enclosure must be weatherproof, tamper-proof, rugged, and durable.

Conventional junction boxes are standard rectangular enclosures having a swinging front panel hinged along one side that opens outward to provide access for servicing. Multiple apertures are spaced along the bottom or sides of the enclosure to provide separate access for the lines. The terminal block(s) are centrally mounted in the enclosure with sockets facing outward, and the lines are routed into the appropriate sockets.

Specifications for such enclosures are proposed in Bellcore Technical Advisory TA-NWT-000014, Issue 3, November 1990, "Generic Requirements of Aerial Cable Terminals," issued by Bell Communications Research, Inc. Such requirements are directed toward protection of electrical connections between main distribution cables and service lines for long in-service use against all environmental effects commonly encountered, including precipitation, temperature extremes, corrosion, dust, debris, ultraviolet light, insects, rodents, reptiles, birds, and so forth. Also, such enclosures must present no environmental or safety hazards.

Since a ladder is typically required to gain access, conventional terminal enclosure designs are not well-suited for aerial telephone and/or power line applications. With those conventional doors which open forwardly and to the side, it is inherently awkward for a maintenance person to open the door panel while standing on a ladder in front of the enclosure. There is usually insufficient clearance to allow full opening of the door, and the maintenance person is incapable of backing up. This problem often prompts the maintenance person to compromise his/her safety by leaning back on the ladder. Even if the maintenance person manages to open the door panel, there is usually a continuing struggle to keep it open. The wind and/or gravity often forces the door panel closed, and this is most awkward since both hands are invariably needed for working on the terminal block. If the doors are of the type that are lowered vertically during opening, the lower edge of the door commonly interferes with the ladder. The door may not lower fully, or it may snag on the ladder, thereby obstructing raising of the door for closure. It would not be desirable for a door to open vertically in a guillotine manner unless its stability in the open position is guaranteed. Otherwise, the safety of the service person would be endangered.

Clearly, it would be greatly advantageous to provide a terminal enclosure which can be easily opened with a minimum of frontal clearance and which will remain open for the duration of servicing.

SUMMARY OF THE INVENTION

It is, therefore, an object of the present invention to provide an improved design for a terminal enclosure to allow opening with a minimum of frontal clearance such that a maintenance person can gain access without leaning back on the ladder, thereby compromising his/her safety.

It is another object to provide a terminal enclosure having doors mounted on locking hinges to prevent inadvertent closing during servicing.

It is another object to provide a design for an environmentally sound, aesthetically pleasing, lightweight, durable, and reliable terminal enclosure with the above-described qualities for housing standardized terminal blocks.

It is another object to provide a design for a terminal enclosure as described above which is simple and lends itself to economical high volume manufacture and assembly from molded plastic or metal parts.

According to the above-described objects, the present invention provides a terminal enclosure having an elongate open-faced base section bounded at the ends by two perpendicular end panels. A pair of gull-wing doors is pivotally attached at the sides of the base section to close thereon. The gull-wing doors are contoured to form a continuous vaulted cover over the base section when pivoted into a closed position.

The doors are each formed with a plurality of legs that extend downwardly and are angled inwardly for pivotal connection to the underside of the base section or to a mounting bracket attached thereto. The combined curvature of the legs and the doors minimizes the vertical clearance necessary for pivoting the doors into the open position, and the maintenance person need not lean backward on the ladder.

In addition, the legs of the doors are coupled to the base section or mounting bracket at locking hinges that releasably secure the doors in the fully-opened position. This prevents the doors from blowing shut and frees both hands of the maintenance person.

One or more retaining pin(s) engage the doors to retain them on their respective hinges, and the retaining pins may be retracted from inside the terminal enclosure to release the doors for removal.

Other advantages and results of the invention are apparent from the following detailed description by way of example of the invention and from the accompanying drawings.

DETAILED DESCRIPTION OF THE PREFERRED EMBODIMENTS

Figure 1:
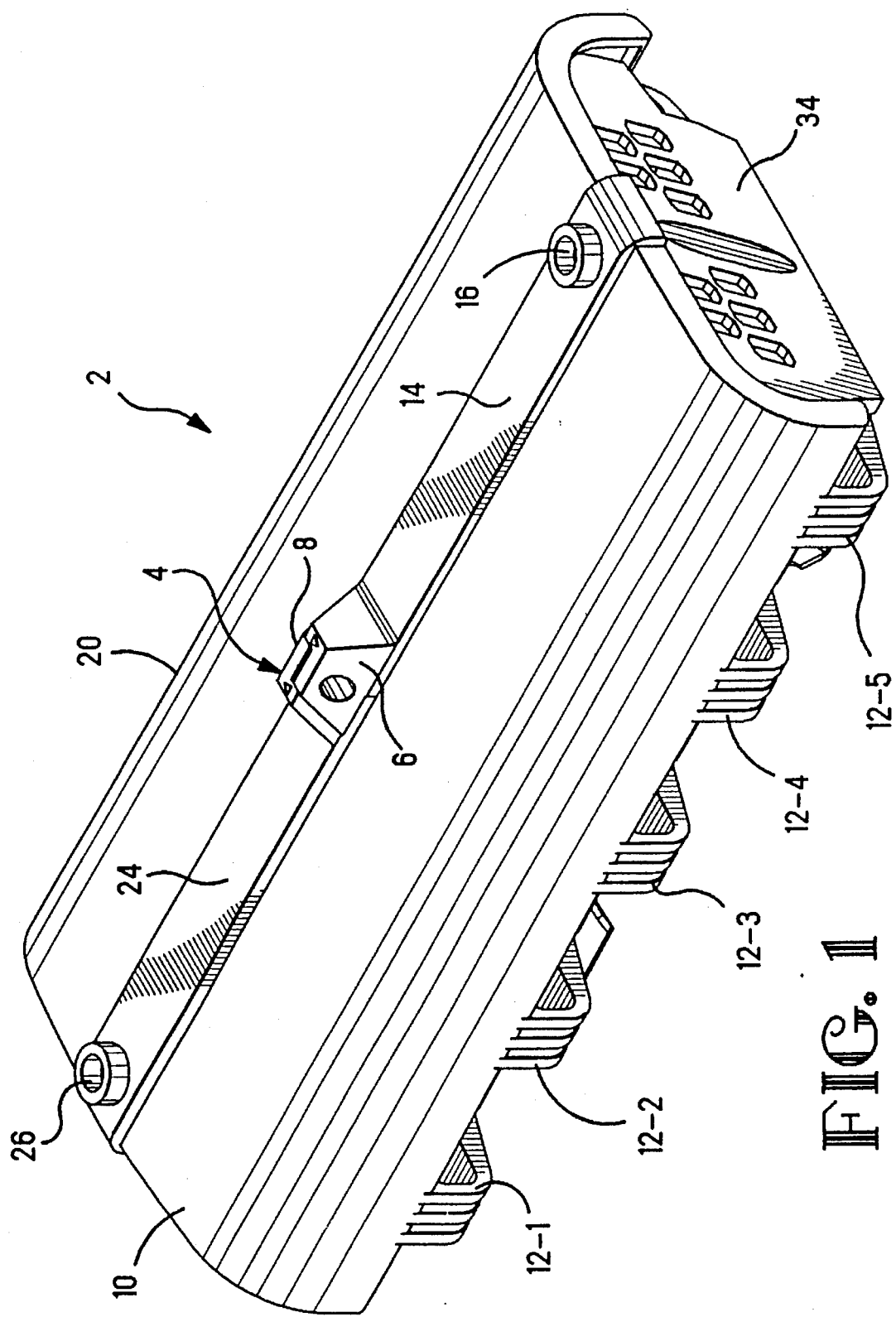
FIG. 1 is a top perspective view showing one exemplary embodiment of the terminal enclosure 2 according to the present invention.
Figure 2:
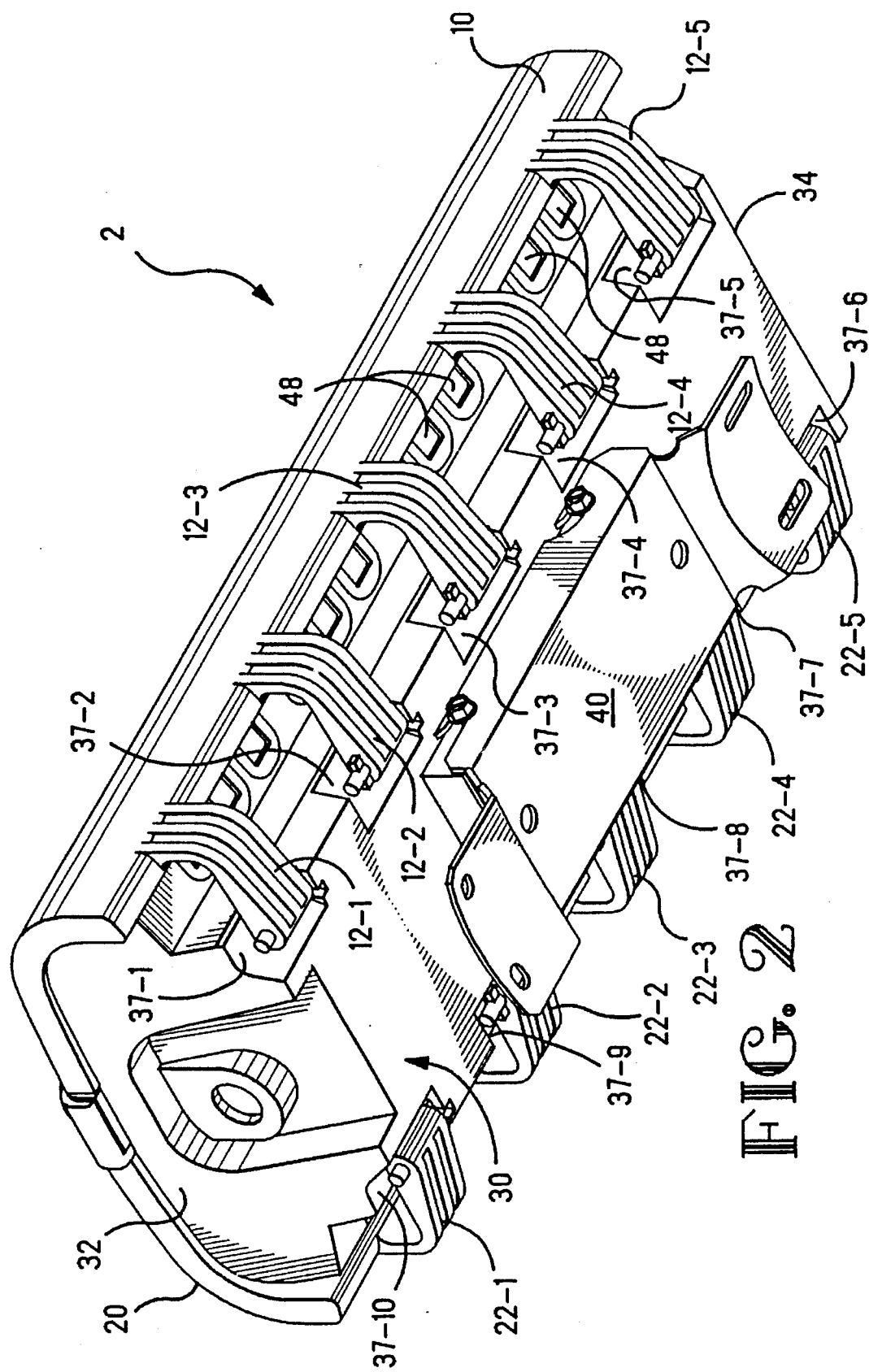
FIG. 2 is a bottom perspective view of the terminal enclosure 2 of FIG. 1.

With more particular reference to the drawings, FIGS. 1 and 2 are a top perspective view and a bottom perspective view, respectively, showing one exemplary embodiment of a terminal enclosure 2 according to the present invention.

The terminal enclosure 2 incorporates gull-wing doors 10 and 20 for convenient frontal access to the interior of the enclosure 2. Gull wing doors 10 and 20 close upon a base section 30 which is generally formed in the shape of an open-faced rectangular trough. In the illustrated embodiment, doors 10 and 20 and base section 30 may each be integrally molded of plastic or fiberglass.

The base section 30 is bounded by a pair of end panels 32 and 34 which rise above the hollow of the base section 30. Both end panels 32 and 34 may be formed with a plurality of holes as required to provide ingress for the individual transmission/distribution lines to the interior of the terminal enclosure 2. In the illustrated embodiment, end panel 34 is shown to have ten holes to pass ten shielded lines, and the other end panel 32 is formed with a single enlarged hole to pass a single bundled (multiple-line) cable. In addition, multiple holes or recesses may be formed along the sides of the base section 30 to provide lateral ingress for transmission/distribution lines. Rubber grommets 48 are provided around each hole/recess to insure an impervious seal around each line. This helps to prevent moisture, debris, and insects such as bees from entering the terminal enclosure 2.

The gull-wing doors 10 and 20 are pivotally mounted on each side of the base section 30, and each door spans one-half of the open face of base section 30. Use of a double-door configuration in itself reduces the necessary frontal clearance for opening the doors by a factor of 50% over the conventional single-door configuration, and the need for any clearance is virtually eliminated by the manner in which the gull-wing doors 10 and 20 are pivoted to base section 30. The pivot locations are recessed inwardly from the side walls of the enclosure and rearwardly from the interior open face thereof, so that the gull-wing doors are rotated generally to the sides and rearwardly.

The generally flat bottom of base section 30 meets the sides thereof along two parallel edges. Both edges are interrupted by a series of spaced niches 37-1 ... 10. Both gull-wing doors 10 and 20 include a corresponding series of legs 12-1 ... 5 and 22-1 ... 5, respectively, and each leg 12-1 ... 5 and 22-1 ... 5 is angled to wrap around the base section 30. Each leg 12-1 ... 5 and 22-1 ... 5 is pivoted at the underside of base section 30 within a corresponding niche 37. This way, legs 12-1 ... 5 and 22-1 ... 5 pivot directly backward with respect to the base section 30 as doors 10 and 20 are opened. Consequently, the doors 10 and 20 fall away from the sides of base section 30 rather than opening outward. Virtually no frontal clearance is required. This is in sharp contrast to conventional terminal enclosure doors which open outwardly for 180° and require significant frontal clearance. In addition, the gull-wing doors 10 and 20 of the present invention give an aesthetically pleasing contoured appearance. All legs 12-1 ... 5 and 22-1 ... 5 may be ribbed (as shown), or may be otherwise reinforced to increase durability.

The grommeted holes or recesses formed along the side walls of the bottom section 30 are positioned relative to the legs 12-1 ... 5 and 22-1 ... 5 for guiding cables in bunches out from said legs.

Referring to FIGS. 1 through 4, doors 10 and 20 are contoured to conform to the end panels 32 and 34, and both doors are formed with mating seams 14 and 24 which merge when fully closed over base section 30 to provide an overlapped weatherproof seal. Preferably, the seams 14 and 24 are hermaphroditic (as shown). This way, the gull-wing door 10 is identical to door 20 and both can be formed from a single mold.

Preferably doors 10 and 20 are securable shut by conventional tamper-resistant screws or the like. Both ends of both seams 14 and 24 are adapted for use with such accessories: a hole is formed at one end of each door with the hole formed through the overlying door edge portion, and the overlying seam is formed with a collar 16 and 26 surrounding the hole to support the fastener, and a recess 15 is formed at the other door end extending in from the outer edge of the seam, with the recess 15 being on the underlying door edge portion at the seam to be received around the shank of the fastener upon closing of the doors, after which the fastener may be tightened. In addition, catch 4 is formed at the midpoint of seams 14 and 24 to allow insertion of a tamper-tag or a locking device, and comprises complementarily shaped apertured catch sections 6,8 on doors 10,20.

Figure 6:
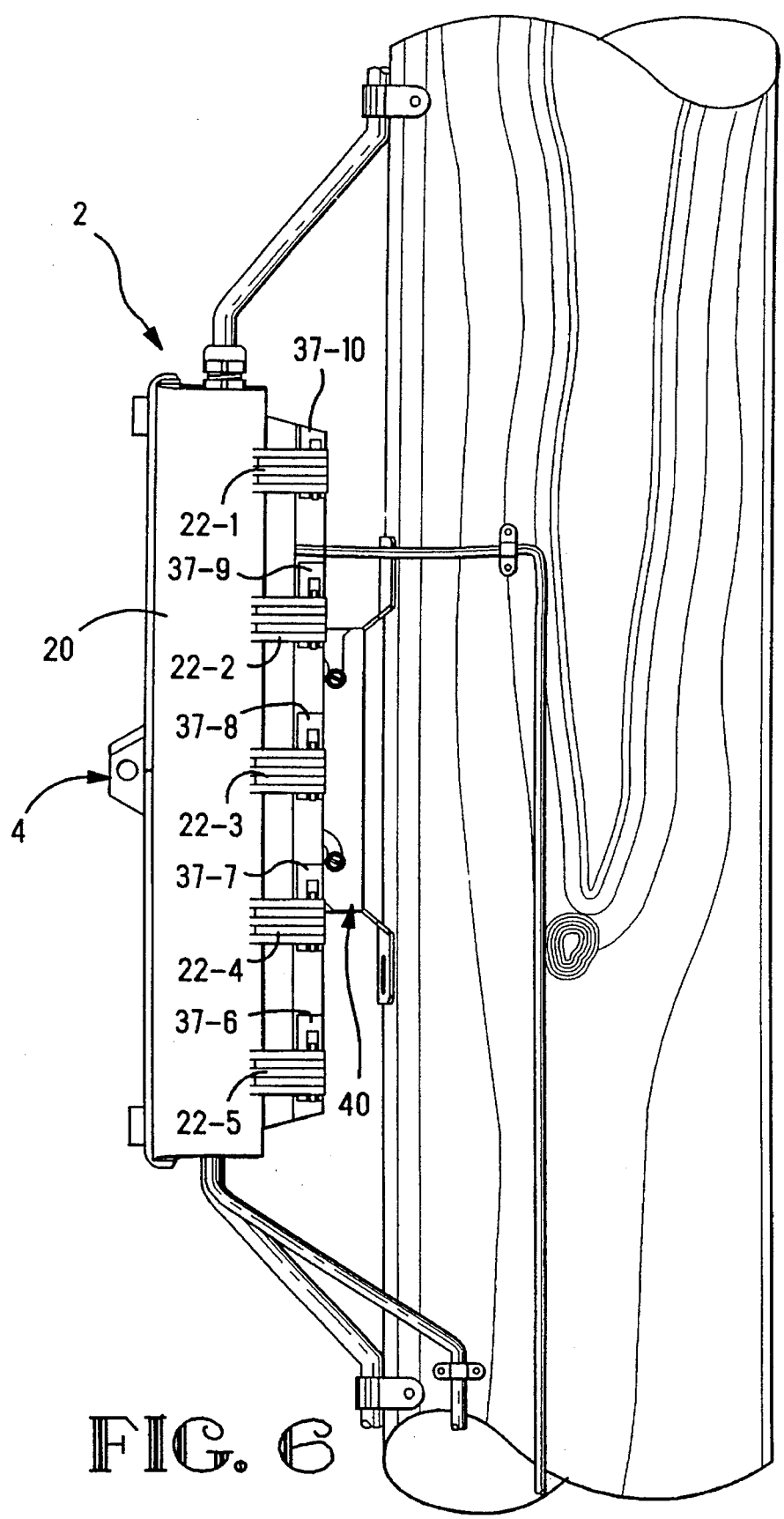
FIG. 6 is a side view of the terminal enclosure 2 of FIGS. 1–3 which shows the mounted door 10 with multiple locking hinge assemblies as in FIG. 5.

The terminal enclosure 2 of the present invention is intended for mounting outdoors on a telephone pole or the like as can be discerned from FIG. 6, and an appropriate mounting bracket 40 may be provided on the underside of base section 30 for this purpose. The exemplary mounting bracket 40 shown in FIG. 2 is contoured to conform to a standard telephone pole (see FIG. 6) and it may be screwed or otherwise fastened thereto. Mounting bracket 40 introduces a small clearance between the back of terminal enclosure 2 and the telephone pole.

Figure 3:
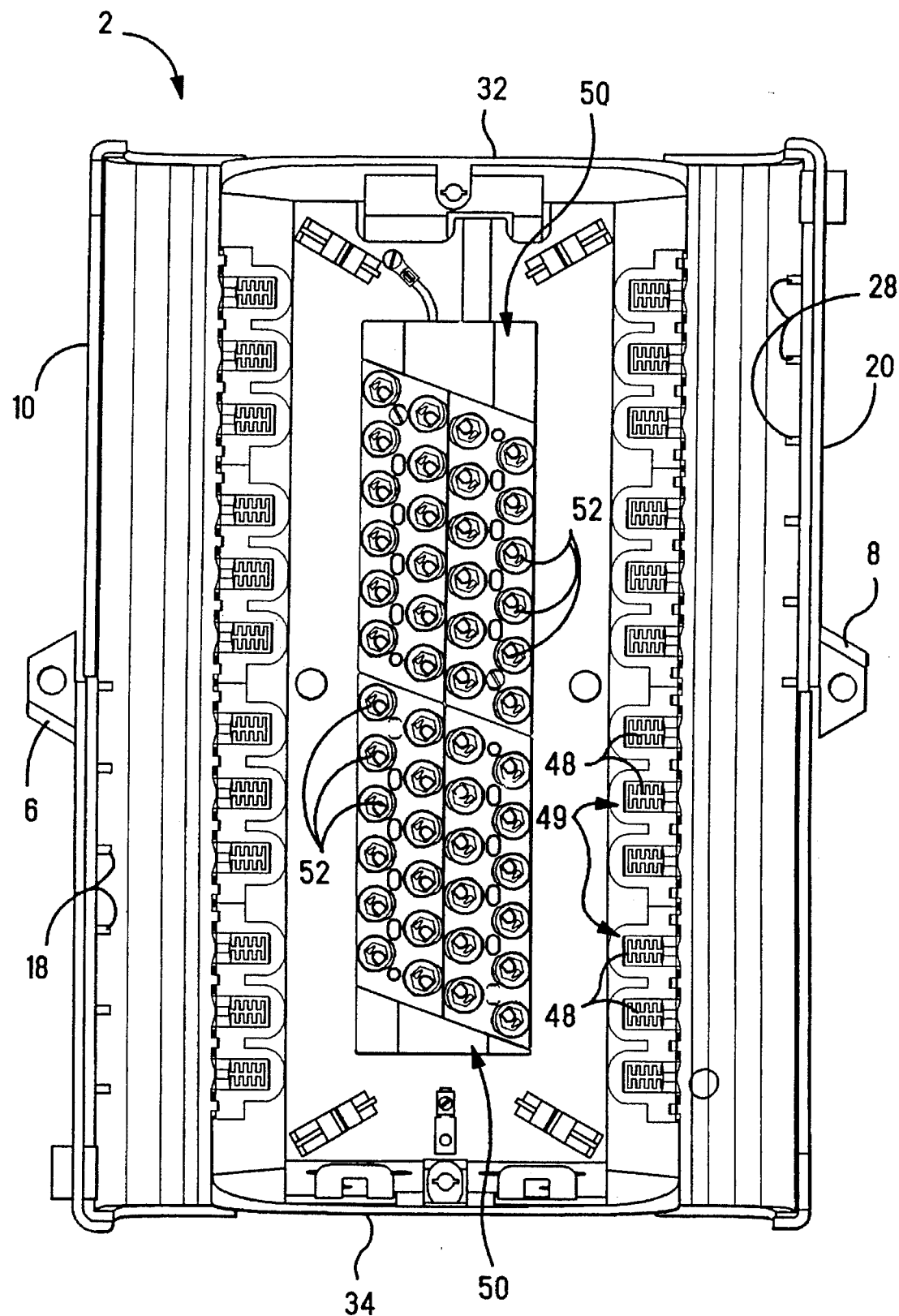
FIG. 3 is a top view of the interior of the terminal enclosure 2 of FIGS. 1 and 2.

As shown in the frontal view of FIG. 3, the interior of terminal enclosure 2 houses one or more conventional terminal block(s) 50 which are anchored to base section 30. Each terminal block 50 contains an array of individually siloed terminals 52 each being capable of terminating a respective conductor of a service cable to a corresponding conductor of a distribution cable. Grommets 48 along side edges of base section 30 are seen to be sections of multicable edge grommet members 49 disclosed in greater particularity in U.S. patent application Ser. No. 08/032,889 filed Mar. 18, 1993 (concurrently herewith) and assigned to the assignee hereof. The illustrated terminal blocks 50 are two interlocking AMP communications-type terminal blocks commercially available Part Nos. 769209-5, 775209-5, 769165-2, and 775165-2, each designed for terminating twenty-five pair cables. However, the invention is designed to accommodate a wide range of other terminal blocks for numerous applications, including standard telephone communications terminal blocks (as shown), cross-connect blocks or distribution terminal blocks, and so forth.

Figure 4:
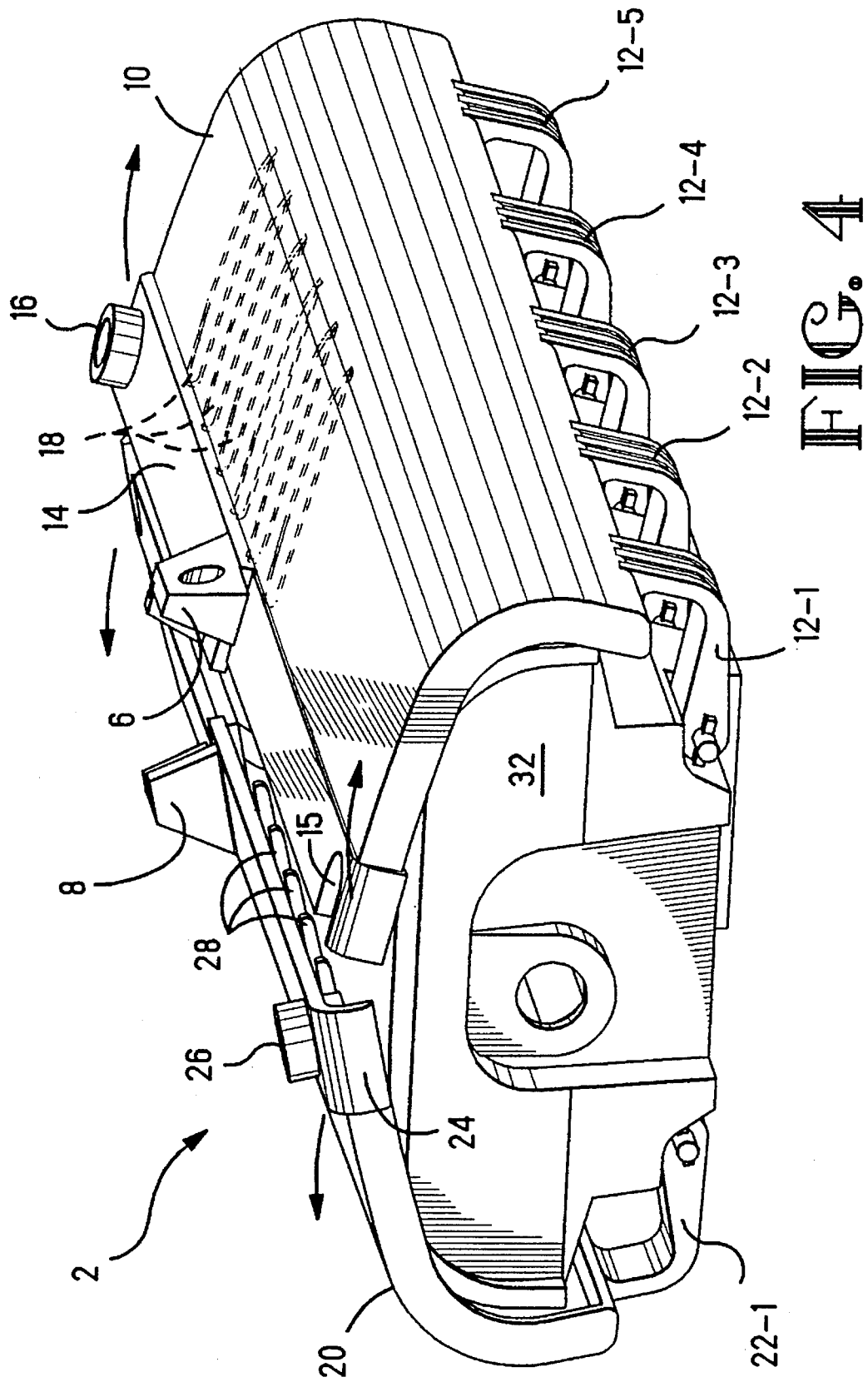
FIG. 4 is a perspective view of the terminal enclosure 2 of FIGS. 1–3 illustrating the fit of the mating gull-wing doors 10 and 20.

As shown in FIGS. 3 and 4, the interior of doors 10 and 20 are each preferably formed with a series of spaced interlocking ribs 18 and 28 to increase their structural stability. Ribs 18 on door 10 provide underlying support for door 20 as the edge of door 10 overlies the edge of door 20. Similarly, ribs 28 on door 20 provide underlying support for door 10 as the edge of door 20 overlies the edge of door 10. Ribs 18 and 28 also serve to buttress doors 10 and 20 in the closed position.

Figure 5:
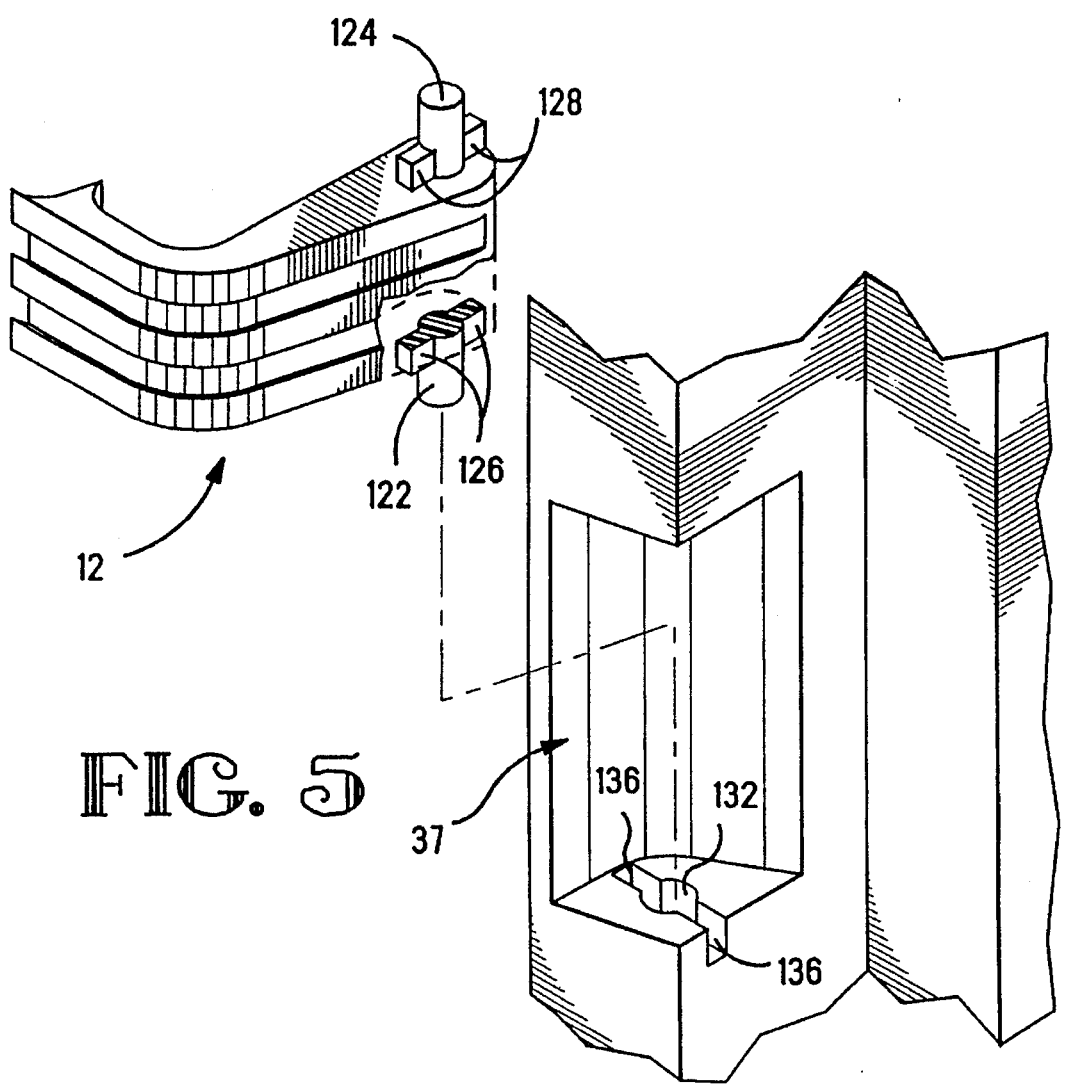
FIG. 5 is an exploded perspective view of the locking hinge assembly for mounting the gull-wing doors 10 and 20.

FIG. 5 is an exploded illustration showing the manner in which an exemplary leg 12 of door 10 is pivotally to a mounting section of the enclosure, by the leg end being pivotally attached to base section 30 within niche 37. The legs 12-1 . . . 5 and 22-1 . . . 5 are all pivoted in the same manner so that doors 10 and 20 may be selectively locked in an open position during servicing. Hence, there is no struggle against wind and/or gravity to keep doors 10 and 20 in an open position. This frees both hands for working on the terminal block.

As shown, the protruding tip of leg 12 is formed with an axle segment 122 protruding from a side surface of the leg end, and which is rotatably carried in a cavity 132 formed in an upwardly facing bearing surface of niche 37. Two locking tabs 126 flank the axle segment 122, and these are received in two corresponding slots 136 which flank axle-receiving cavity 132. It is important to note that a counterpart axle segment 124 and locking tabs 128 should be formed on the opposite side of leg 12 if both gull-wing doors 10 and 20 are to be truly interchangeable. Only then can both doors 10 and 20 be formed from a single mold. The base section 30 is typically mounted vertically on a telephone pole or the like. Once axle segment 122 is inserted into cavity 132 in the illustrated manner for all legs, the weight of door 10 is sufficient to maintain the pivotal seating.

FIG. 6 is a side view of the terminal enclosure 2 illustrating the manner by which all five legs 22-1 . . . 5 of door 20 are pivotally attached to base section 30 within niches 37-1 . . . 5. Door 20 may easily be removed from base section 30 simply by lifting the respective axle segments 122 out of cavities 132 for all legs 22-1 . . . 5 upon retraction of a retaining pin 142 as seen in FIG. 9.

Figure 7:
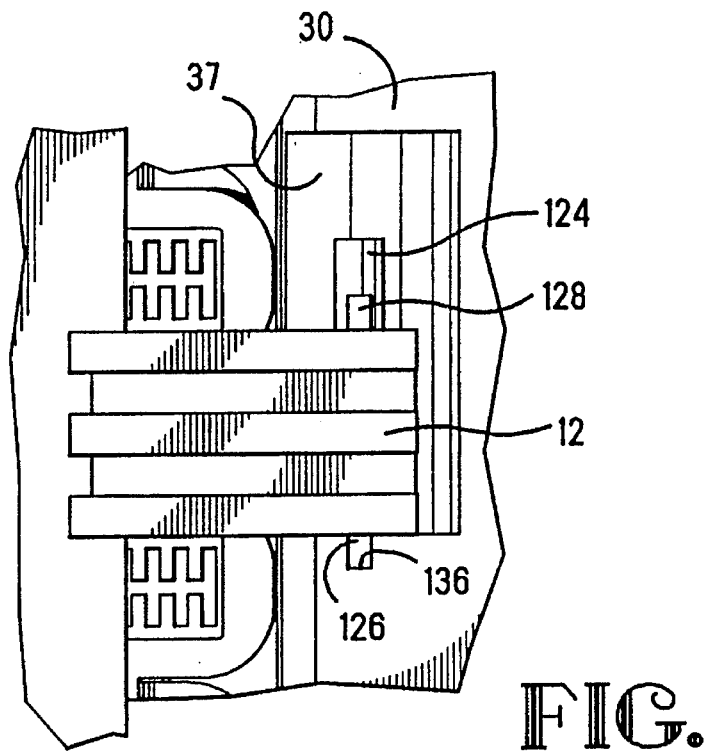
FIG. 7 is an enlarged view of the locked hinge assembly which maintains the gull-wing doors 10 and 20 in a full-open position.
Figure 8:
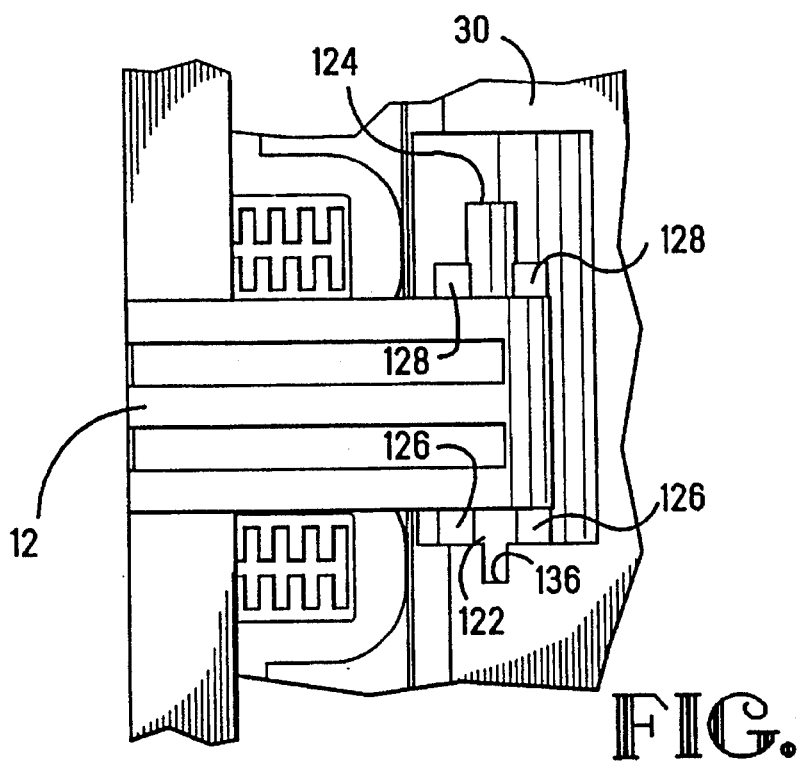
FIG. 8 is an enlarged view of the unlocked hinge assembly which allows the gull-wing doors 10 and 20 to be pivoted into a closed position.

FIGS. 7 and 8 are sequential views illustrating the lock-and-release operation of the cooperating leg 12 and base section 30 of FIG. 5. When a door 10 or 20 is closed, bottom tab surfaces abut and bear against the upwardly facing (or bearing) surface of niche 37 (see FIG. 8), and when the door is fully opened so that locking tabs 136 become aligned with slots 136, the door becomes translated as the locking tabs 126 enter and become trapped in slots 136 as shown in FIG. 7. As a result, the doors 10 and 20 remain locked in the fully open position. Doors 10 and 20 may easily be freed from the locked fully-open position simply by lifting the the door and thus move locking tabs 126 out of slots 136. Alternatively, grooves 136 may be tapered. This way, doors 10 and 20 may be freed from the locked full-open position by camming the respective locking tabs 126 out of the tapered slots. As shown in FIG. 8, doors 10 and 20 remain free to pivot whenever they are not fully opened.

The securing arrangement of the present invention for securing a door to an enclosure permits pivoting of the door between closed and open positions and retention in the open position, and it can be said generally to comprise a two-tiered seating for the leg end with a first level defined by locking tab bottom surfaces abutting the upwardly facing surface of the niche surrounding the leg end, and the second level defined by a side surface of the leg end abutting the upwardly facing niche surface. The slots can be said to define a stop to selectively inhibit door pivoting to the closed position, by being cooperable with the locking tabs of the axle segment of the leg end when the door has been rotated to the open position, to prevent the door from rotating to its closed position until the door has first been translated by lifting, disengaging the tabs from the slots.

Figure 9:
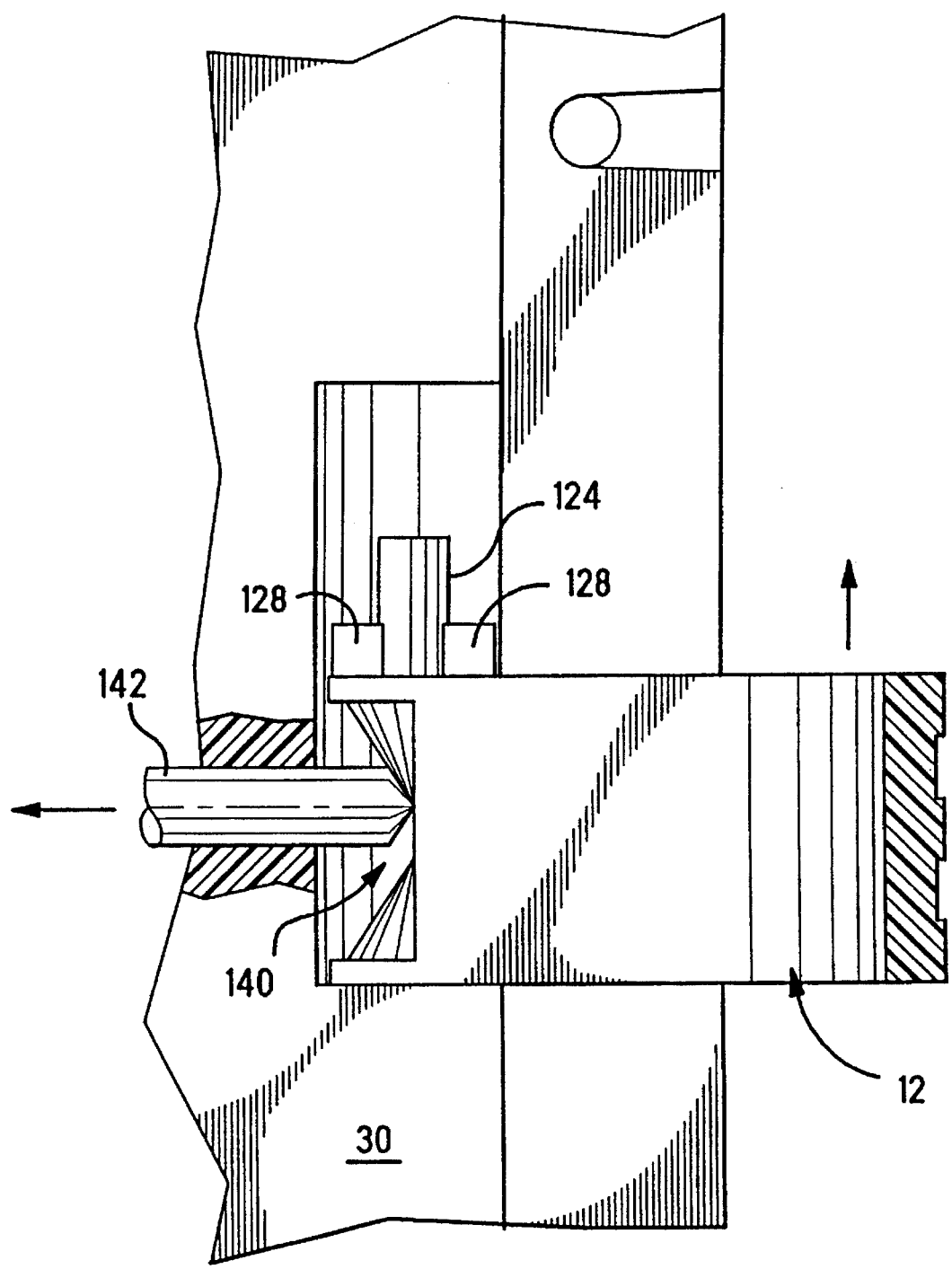
FIG. 9 is a cross-sectional view of the locking hinge assembly of FIGS. 5–8 which shows a retaining assembly for preventing inadvertent or unauthorized removal of gull-wing doors 10 and 20 from base section 30.

FIG. 9 is a cut-away view illustrating a retaining assembly which protects against inadvertent or unauthorized removal of doors 10 and 20. The retaining assembly comprises a tapered notch 140 formed around the pivoting axis on the underside of leg 12. In addition, a retractable retaining pin 142 which protrudes into notch 140. The retaining pin 142 is carried within the base section 30 and should be accessible from within the interior of the terminal enclosure 2 to allow retraction. This way, a maintenance person can easily remove the pin 142 from the notch 140, thereby freeing the leg 12 for removal. The retaining pin 142 may be spring-mounted in base section 30 to maintain it in a normally engaged position with notch 140. It should be noted that the purpose of the above-described retaining assembly may be served by incorporating only one such assembly for each door 10 and 20. It is only necessary to retain one leg in each series 12-1 . . . 5 and 22-1 . . . 5 to effectively retain all ten legs.

Figure 10:
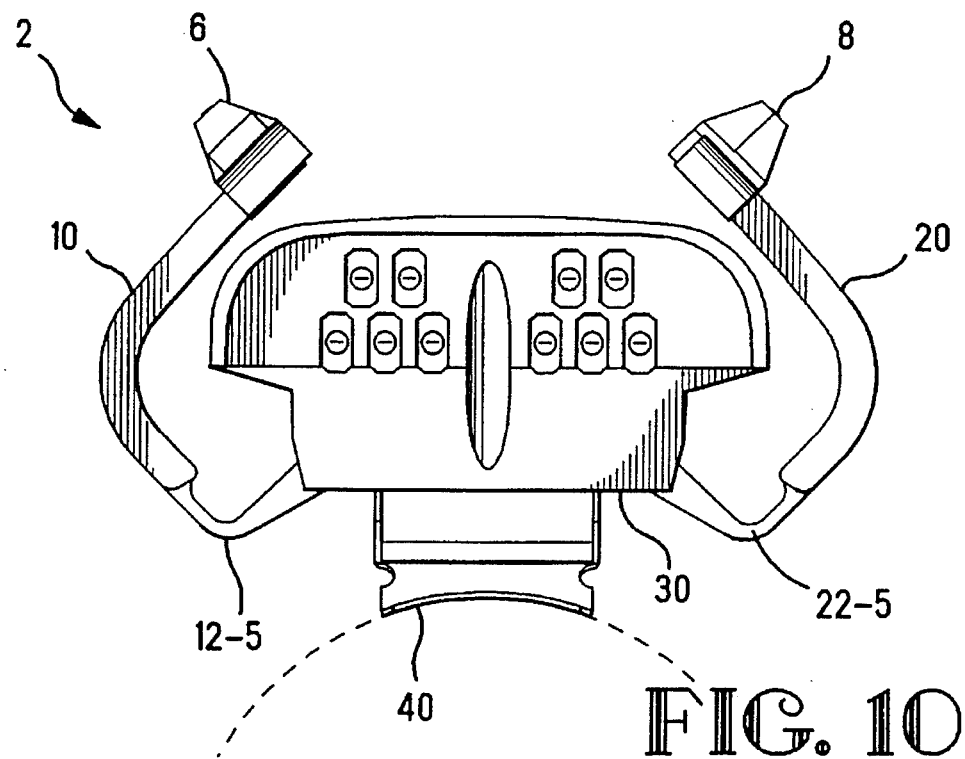
FIGS. 10 and 11 are sequential bottom views of the terminal enclosure 2 of FIGS. 1–3 illustrating the minimal frontal clearance needed to open the mating gull-wing doors 10 and 20.
Figure 11:
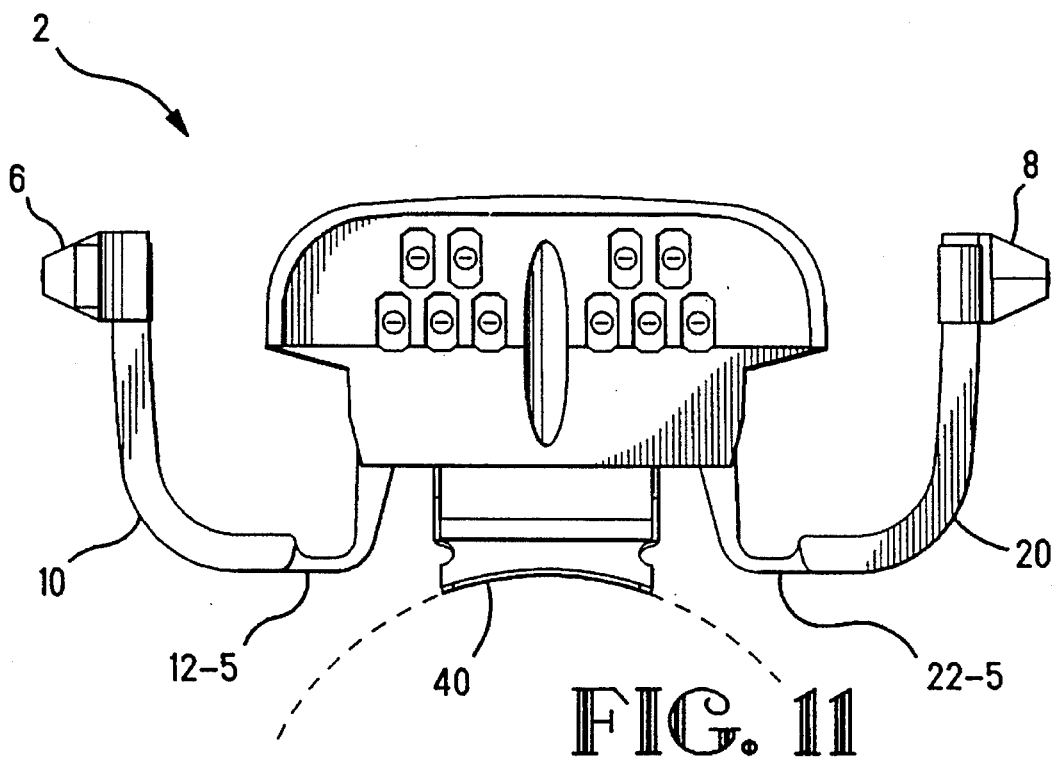

FIGS. 10 and 11 are sequential bottom views illustrating the opening of doors 10 and 20. Clearly, gull-wing doors 10 and 20 require virtually no frontal clearance as they are opened outward. They may be opened by a maintenance person standing directly in front of the terminal enclosure 2 on a ladder, and there is no need to lean backward to afford more clearance.

FIGS. 12–18 illustrate an alternative embodiment of the terminal enclosure 200 which is better suited for construction from sheet metal such as aluminum or steel. A clasp 228 is attached to the overlying door 220, and clasp 228 catches a lip formed in the underlying door 210 to secure the doors 210 and 220 in the closed position. Both doors 210 and 220 may be formed with two holes located at both ends of the seam 236. This allows the doors 210 and 220 to be locked in the closed position by conventional tamper-resistant screws 229, with door 210 being closed first in the embodiment shown to underlie the edge of door 220 after which such screws 229 are urged through the holes of the edge portion of the underlying door 210. Tamper resistant screws 229 may be used as an alternative to clasp 228.

Figure 12:
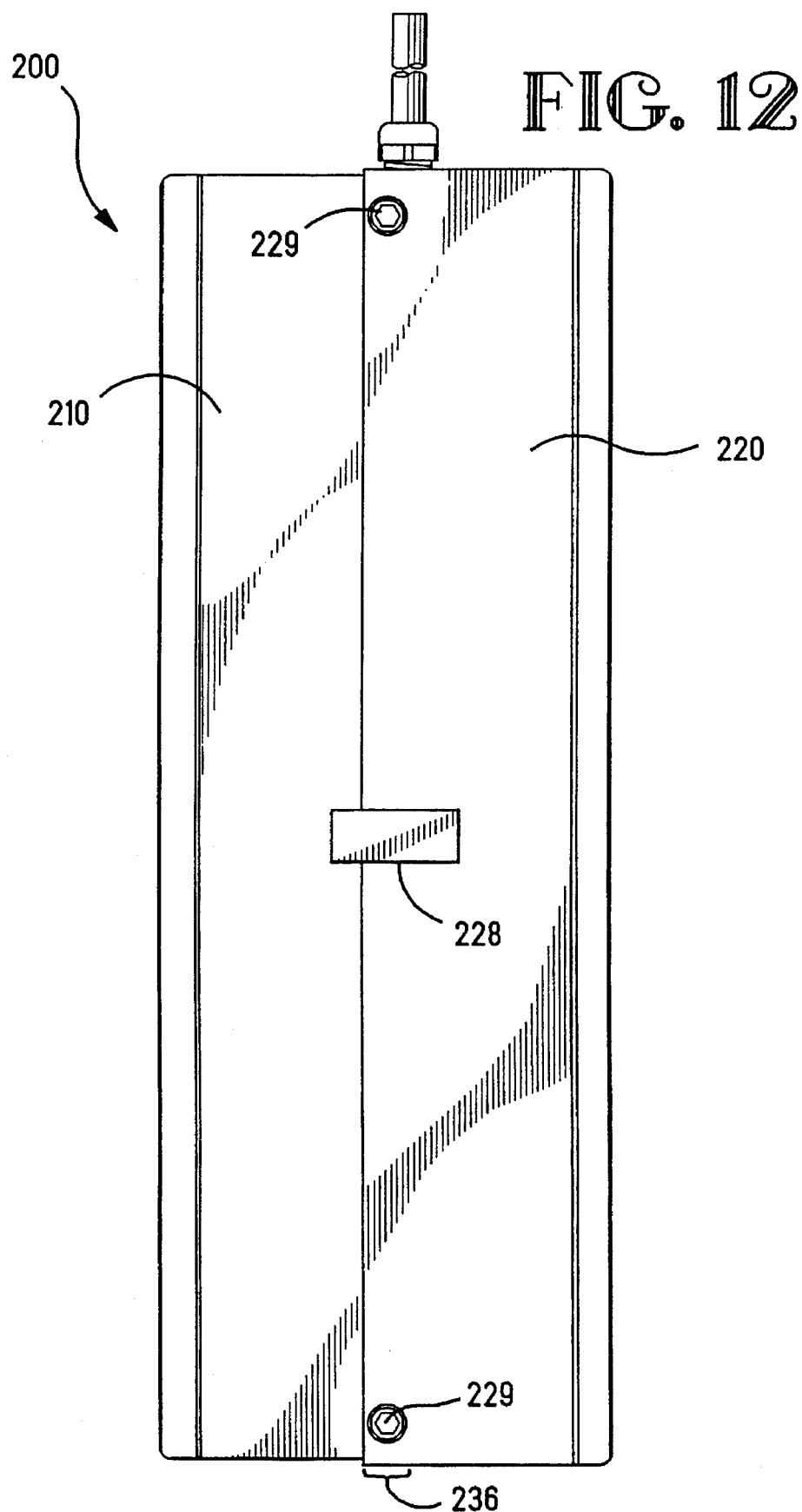
FIG. 12 is a top view showing a second exemplary embodiment of a terminal enclosure 200 according to the present invention.
Figure 13:
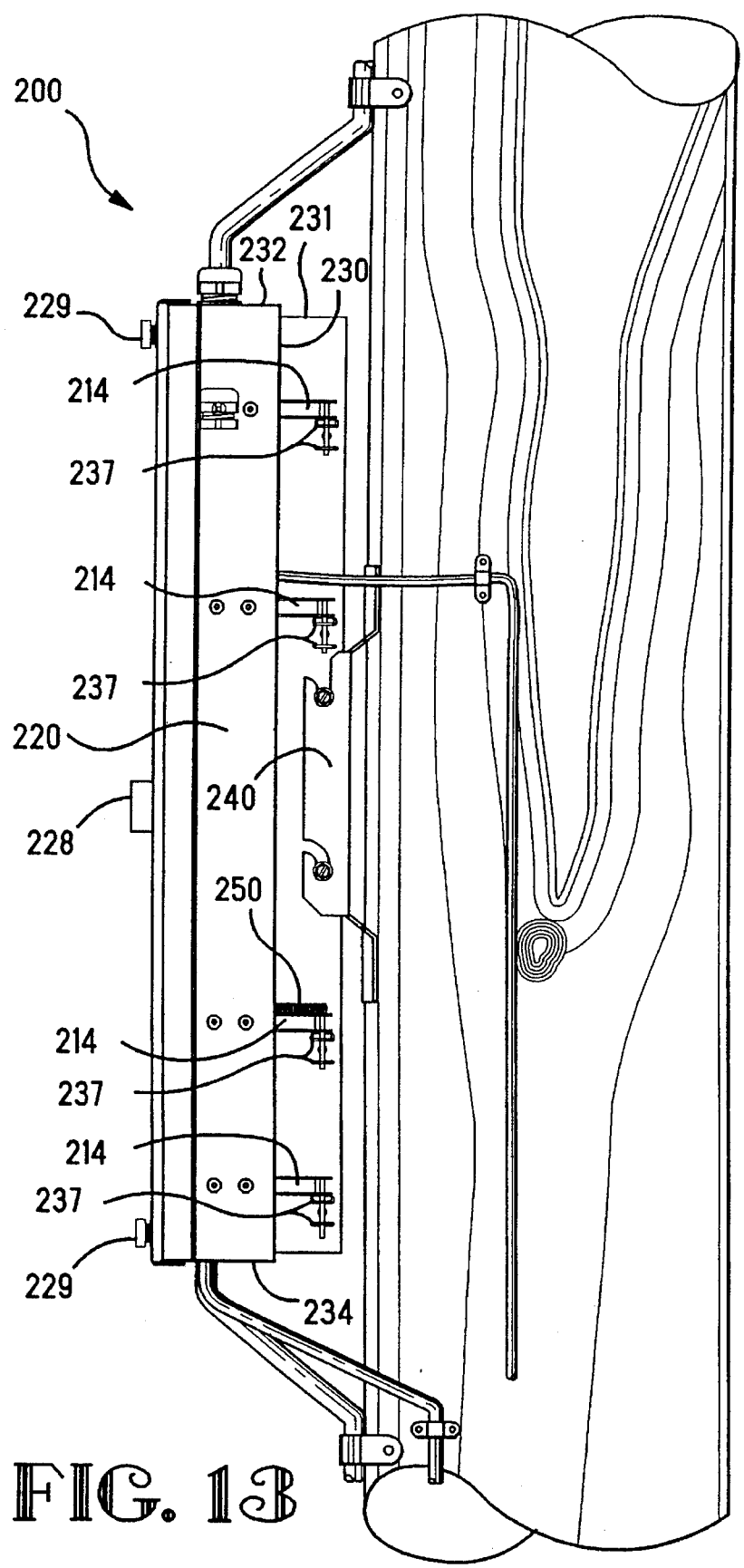
FIG. 13 is a side view of the terminal enclosure 200 of FIG. 12.

FIGS. 12 and 13 are a front perspective view and a side view, respectively, of the terminal enclosure 200 with stamped or formed gull-wing doors 210 and 220. Gull wing doors 210 and 220 close upon a base section 230.

Figure 14:
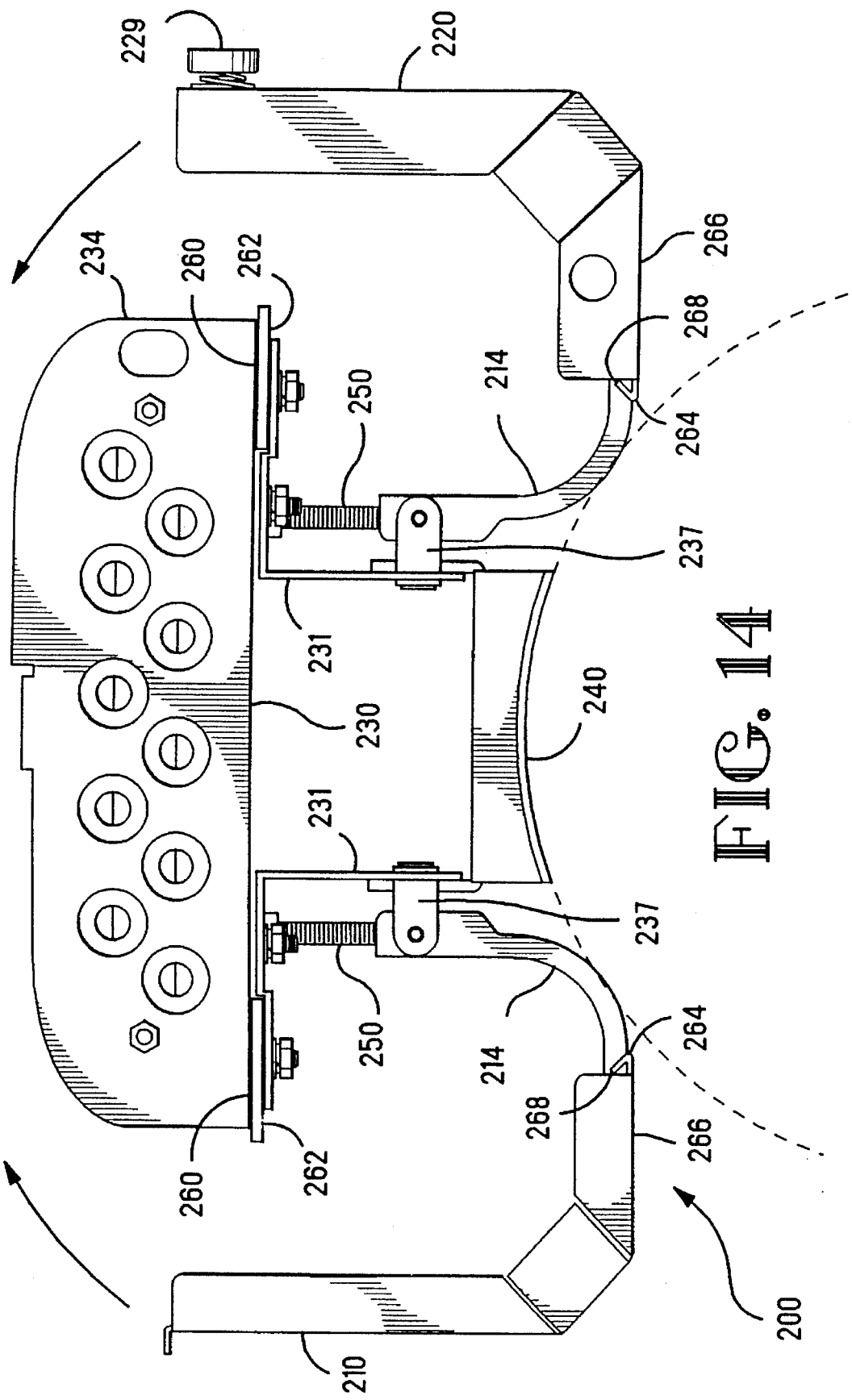
FIG. 14 is a bottom view of the terminal enclosure 200 of FIGS. 12 and 13.

As shown in FIG. 14, base section 230 is formed in the shape of a planar rectangular plate bounded by two perpendicular end panels 232 and 234 (FIG. 13). As before, holes may be formed in both end panels 232 and 234, and holes or recesses may be formed along the edges of the base section 230 to provide ingress for communication lines. The holes or recesses should be positioned relative to the legs 212 and 214 for guiding cables in bunches out from between said legs. Likewise, rubber grommets should be provided around each hole to insure an impervious seal around each line. In the present embodiment, recesses are defined along each lateral edge of base section 230 for respective cables, and continuous strips 260 of elastomeric material are affixed along each lateral edge. Strips 260 have an outer end portion 262 which extends beyond the lateral edge of the base section 230 to an outer edge. Strips 260 are formed with a plurality of slits which extend to the outer edge thereof at each recess in base section 230. This permits a cable to be slidably inserted along the slit into the recess, with the elastomeric strip 260 gripping the cable as it extends through the slit. Upturned flanges 264 are formed along the intersection of each door 210 and 220 with its corresponding legs 212 and 214, respectively. Flanges 264 extend from sections 266 to an edge 268, respectively, which engage the outer end portion 262 of the associated elastomeric strip 260 outwardly of the array of cables passing therethrough (through the slits). Flanges 264 deflect the elastomeric strips 260 to assuredly close any opening which otherwise may exist between the outer edge of the elastomeric strip and the door, thus preventing ingress of insects and the like.

In the present embodiment, the base section 230 is substantially flat, and a mounting structure formed by opposed flanges 231 extends rearwardly perpendicularly a short distance from the base section 230. As shown in FIGS. 13 and 14, enclosure 200 is mountable for example onto mounting bracket 240 already affixed to a pole by screws, by bolts extending from flanges 231 being lowered into downwardly directed slots of the mounting bracket. A series of hinges 237 is spaced along each of the rearwardly extending flanges 231, and hinges 237 extend outwardly therefrom parallel to the base section 230. The legs 212 and 214 of the gull-wing doors 210 and 220, respectively, wrap around the base section 230 and are pivotally anchored to corresponding hinges 237. As before, the doors 210 and 220 fall away from the sides of base section 230 rather than opening outward, and virtually no frontal clearance is required. Doors 210 and 220 are stamped or formed to conform to the end panels 232 and 234, and the doors overlap along a seam 236 when fully closed over base section 230 to insure a weatherproof seal. Legs 212 and 214 are pivotally anchored to respective hinges 237 at a distance spaced rearwardly from base section 230, and all legs 212 and 214 initially extend laterally outward from rearwardly extending flanges 231 and then forwardly past base section 230. As a result, when doors 210 and 220 are closed they define an open region 270 (seen in FIG. 15) extending between the legs and base section 230 through which the array of cables will extend, exteriorly of the enclosure, with the open region 270 being exposed to the environment and not providing a haven for nests of insects, rodents, birds, or the like.

Figure 15:
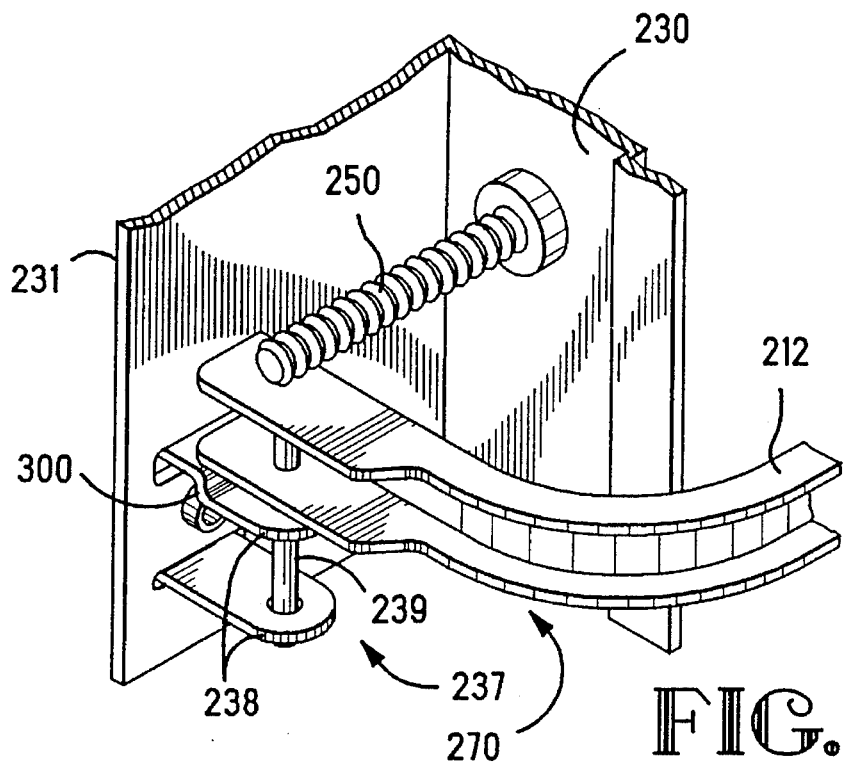
FIG. 15 is a perspective view of the unlocked hinge assembly with the gull-wing doors 210 and 220 of FIGS. 12–14 in a closed position.
Figure 16:
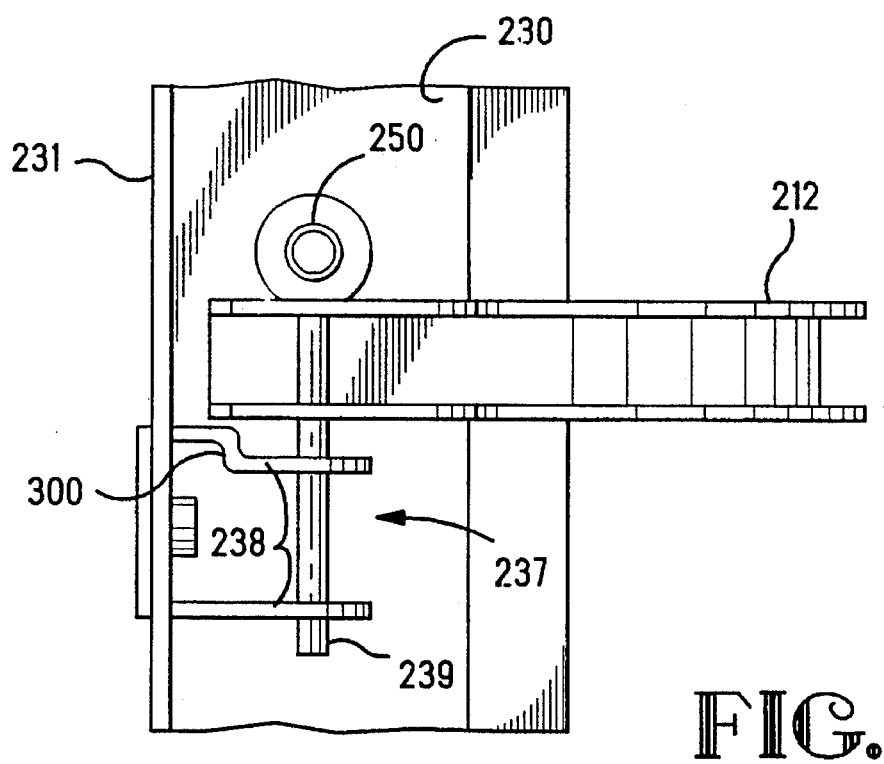
FIG. 16 is an enlarged view of the unlocked hinge assembly of FIG. 15.

FIGS. 15 and 16 are an enlarged perspective view and a back view, respectively, of an exemplary leg 212 of door 210 which is pivotally attached to the hinge 237 on rearwardly extending flanges 231. In practice, all legs 212 and 214 are attached in the same manner, and hinges 237 make it possible to selectively lock doors 210 and 220 in an open position during servicing.

As shown, each hinge 237 further comprises two outwardly extending ears 238 having aligned axle receiving apertures or holes at their tips. An axle 239 is carried between the ears 238 in the holes, and the axle 239 protrudes to one side of ears 238. The leg 212 is stamped into a generally U-shaped cross-section, and holes are formed in the side wall sections of leg 212 at the base to receive axle 239 and stabilize its orientation. In this manner, leg 212 is pivotally carried on hinge 237 by axle 239. The weight of door 210 is sufficient to maintain the pivotal seating.

A screw 250 may be threaded through the bottom of base section 230 to maintain leg 212 on the corresponding hinge 237. Screw 250 serves as the retaining assembly which prevents inadvertent or unauthorized removal of door 210 or 220. Screw 250 may be turned until it extends sufficiently from base section 230 to lock the corresponding leg 212 on axle 239. The screws 250 are accessible at one end from within the interior of the terminal enclosure 200. Hence, each screw 250 may be retracted into terminal enclosure 200 until leg 212 can be unhinged. This way, door 210 may easily be removed from base section 230 simply by lifting the door 210 off of hinges 237. Only one such retaining screw 250 is needed per door 10 and 20 to retain the legs of all doors on their corresponding hinges 237. It is only necessary to retain one of legs 212 to effectively retain all four, and the same is true of legs 214. Alternatively, retractable spring-mounted stems may be used in place of screws 250.

As seen most clearly in FIGS. 15 to 18, the locking feature according to the present invention is accomplished most easily in this embodiment by forming the ear 238 adjacent leg 212 with a slight offset section or bend 300 near its center and dividing the ear into a first section adjacent flange 231 and a second section adjacent the axle-receiving hole. When the terminal enclosure 200 is vertically mounted on a telephone pole or the like, the bend 300 creates an upper tier and a lower tier on which leg 212 rides.

It can be seen that the lower side wall section of leg 212 extends to a first or end edge located a certain first distance from the axle, and extends to a second edge orthogonal to the first edge located a second distance from the axle less than the first distance. When the door is in its closed position as in FIGS. 15 and 16, the portion of the lower side wall between the axle and the first edge is sufficient reach the first section or upper level or tier of the upper support ear 238 and for the lower side wall of the leg to be supported thereby.

Figure 17:
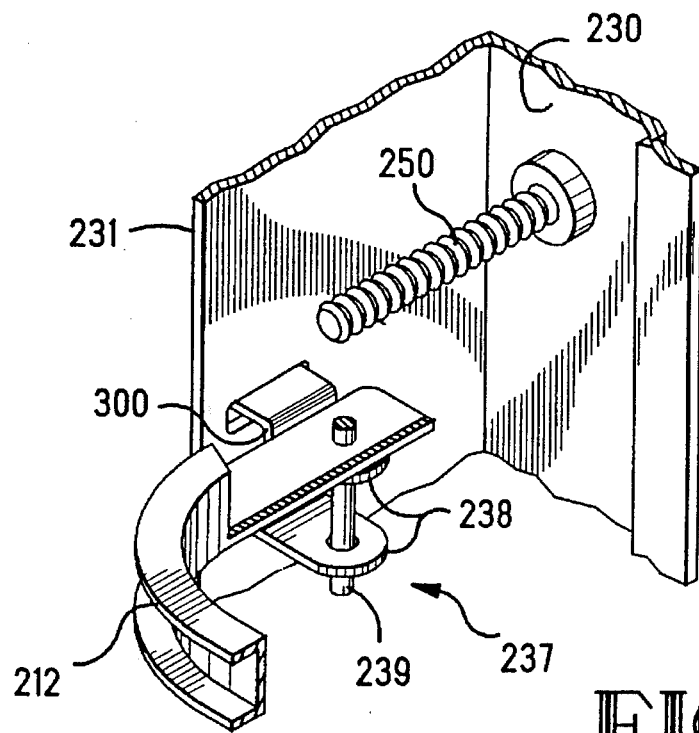
FIG. 17 is a perspective view of the locked hinge assembly with the gull-wing doors 210 and 220 of FIGS. 12–14 maintained in a full-open position.
Figure 18:
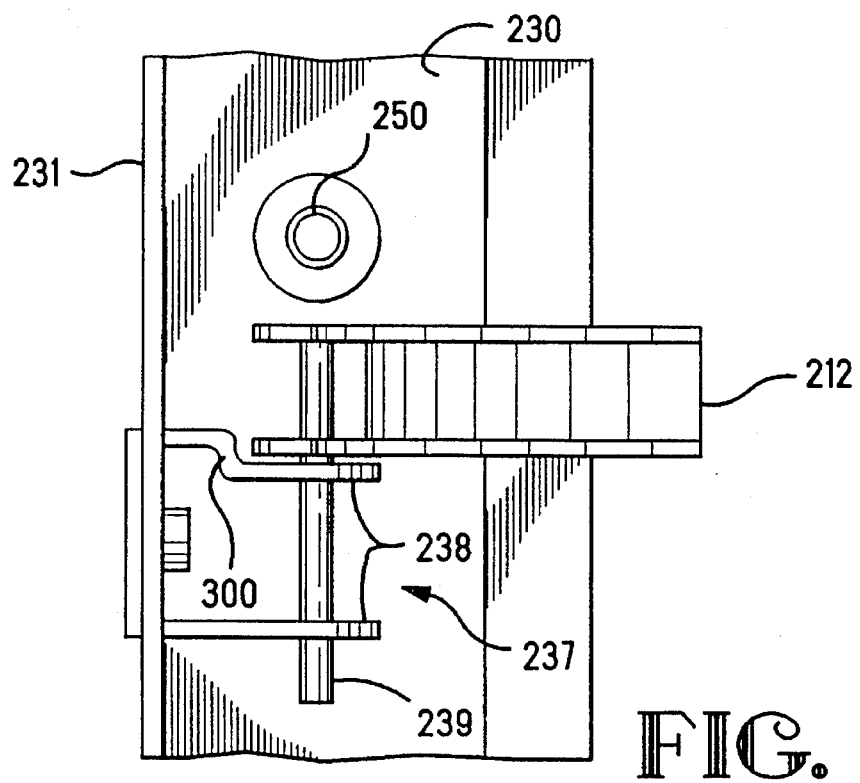
FIG. 18 is an enlarged view of the locked hinge assembly of FIG. 17.

When the door has been pivoted to its open position as in FIGS. 17 and 18, the leg end has translated for the lower side wall to be adjacent the second section of the upper support ear 238 with the second edge extending along and adjacent the offset or bend 300 and abuttable thereagainst to prevent the door from being rotated from the open position without the door first being lifted.

FIGS. 15 and 16 are a perspective view and a side view, respectively, illustrating leg 212 riding upon the upper tier. Leg 212 remains seated on the upper tier whenever the attached door (not shown) is not fully open. Hence, the door remains free to pivot into the fully open position. However, when fully opened, the leg 212 falls into the lower tier of ear 238 and becomes trapped by the weight of door 210. As a result, the door 210 remains locked in the fully open position. As before, door 210 may be easily freed from the locked full-open position simply by lifting the respective leg 212 over the bend 300 in ear 238. The bend 300 may be tapered so that door 10 can be freed from the fully-open position by camming the leg 212 over the tapered bend 300.

The locking hinge of the present invention may be used, not only in the two embodiments of dual-door enclosures, but also in enclosures having a single door openable more in a conventional fashion by swinging first frontally and still present the advantage of remaining in a locked open position during servicing, providing substantial assistance to service personnel by permitting unhindered access to the interior of the enclosure.

Having now fully set forth a detailed example and certain modifications incorporating the concept underlying the present invention, various other modifications will obviously occur to those skilled in the art upon becoming familiar with said underlying concept. It is to be understood, therefore, that within the scope of the appended claims, the invention may be practiced otherwise than as specifically set forth herein.

We claim:

1. A securing arrangement for securing a door to an enclosure to permit pivoting of the door between open and closed positions, comprising:

at least one leg extending to an end thereof from a door for pivotal connection thereof to an enclosure;

a mounting section of said enclosure associated with said leg and shaped to define a clearance for said leg end to permit said leg end to be pivoted a selected angular distance when said door is rotated between open and closed positions; and an axle at least including a segment protruding from a side surface of said leg end transversely to define a pivoting axis, said axle being affixed to said leg end and said mounting section in a manner permitting pivoting with respect to at least one of said leg and said mounting section, said mounting section including a bearing surface adjacent said side surface of said leg end and having an axle-receiving aperture extending at least into said bearing surface, said bearing surface being shaped to define a two-tiered seating providing for said leg end and said side surface thereof to be translated along said pivot axis between first and second levels when said door is rotated between closed and open positions respectively, said mounting section further including stop means cooperable with said leg end when said door has been rotated to said open position and said side surface of said leg end has become translated to said second level, to selectively inhibit rotation of said door from said open position to said closed position, whereby said two-tiered seating permits said leg end and its said side surface to be translated along said pivoting axis, from a first level when said door is in said closed position, to said second level when said door has been pivoted to said open position, and prevents said door to be pivoted from said open position to said closed position unless said leg end has first been translated to said first level by manipulation of said door.

2. The arrangement as set forth in claim 1 wherein:

said leg end extends a selected first distance from said axle segment to a first edge and extends at a selected angle to said first edge a selected second distance from said axle segment to a second edge, with said second distance being less than said selected first distance, said selected angle corresponding to an angular distance between an open door position and a closed door position when said door is rotated about said axle segment;

said stop means of said mounting section includes at least one support ear defining said bearing surface and extending from said enclosure adjacent said leg end, said support ear including a first section adjacent said enclosure defining said first level, a second section adjacent said aperture defining said second level, and an offset section orthogonal to said first and second sections and located from said aperture a distance less than said selected first distance and greater than said selected second distance such that said second section is farther from said leg than said first section along said axle segment, whereby said support ear first section abuts, said side surface of said leg end adjacent said first edge when said door is in said closed position, and said offset permits translation of said leg upon said door being rotated to said open position such that said side surface of said leg end adjacent said second edge thereof abuts said support ear second section, and said offset section is abutted by said leg end at said second edge to prevent rotation of said leg to said closed position until said leg has first been translated away from said support ear second section, thereby serving to hold said door in said open position.

3. The securing arrangement as set forth in claim 2 wherein said leg end is a U-shaped channel of a stamped and formed metal leg member and defines a pair of wall sections transverse to said axle and spaced apart therealong, said wall sections including aligned apertures therethrough through which pass said axle, whereby said wall sections hold said axle against lateral movement at two spaced locations and stabilize the orientation thereof.

4. The securing arrangement as set forth in claim 2 wherein said enclosure includes a second support ear transverse to said axle segment spaced from said at least one support ear in a direction away from said leg and including an aperture therethrough through which passes said axle segment, whereby said support ears hold said axle segment against lateral movement at two spaced locations and stabilize the orientation thereof.

5. The securing arrangement as set forth in claim 2 wherein said enclosure includes a retaining pin protruding to a portion spaced from said at least one support ear sufficiently for said leg end to be disposed therebetween whereby said leg end is trapped therebetween to maintain said leg end adjacent said at least one support ear.

6. The securing arrangement as set forth in claim 1 wherein:

said axle segment is defined to be pivoted upon rotation of said door;

said axle segment includes at least one tab extending laterally therefrom with a tab surface facing said bearing surface; and said bearing surface defining at least one slot thereinto associated with each said tab and adjacent said axle-receiving aperture, said bearing surface being engaged by said tab surface when said door is in said closed position to define said first level, and said tab entering said associated slot when said door has been pivoted to said open position to define said second level, and said slot serving as said stop means cooperable with said at least one tab when said tab is disposed within said slot locking said door in said open position and preventing said door to be pivoted to said closed position unless said leg has first been translated to remove said tab from said slot.

7. The arrangement of claim 6 wherein said axle segment includes a pair of opposed said tabs, and said bearing surface includes a pair of said slots associated with said pair of tabs.

8. The arrangement of claim 6 wherein said leg end includes a notch into an end surface of said leg end and partially around said leg end and orthogonal to said pivoting axis, and said enclosure includes a retaining pin orthogonal to said pivoting axis and protruding into said notch to maintain said leg end adjacent said bearing segment and said axle segment in said axle-receiving aperture.

* * * * *